United States Patent Office.

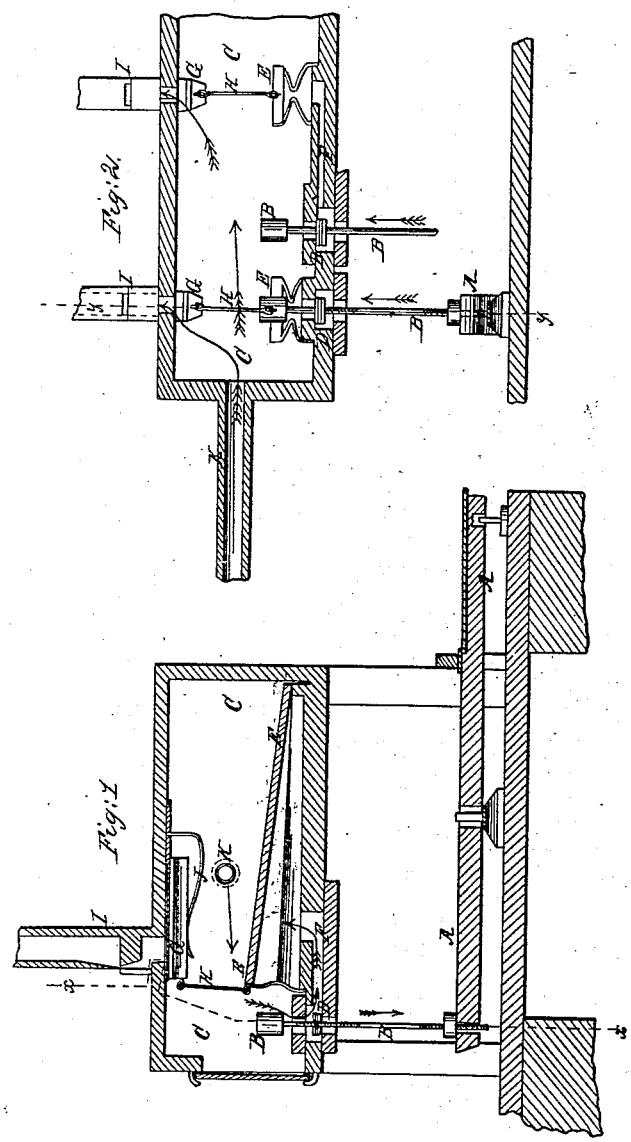

JOHN R. MORTIMORE, OF NEW YORK, N. Y.

Letters Patent No. 98,790, dated January 11, 1870; antedated January 3, 1870.

PNEUMATIC VALVE FOR ORGANS, &c.

The Schedule referred to in these Letters Patent and making part of the same

*To all whom it may concern:*

Be it known that I, JOHN R. MORTIMORE, of New York city, in the county and State of New York, have invented a new and useful Improvement in Organs; and I do hereby declare that the following is a full, clear, and exact description thereof, which will enable others skilled in the art to make and use the same, reference being had to the accompanying drawings, forming part of this specification, in which—

Figure 1 is a detail sectional view of a portion of an organ, illustrating my improvement, taken through the line $y\ y$, fig. 2.

Figure 2 is a detail sectional view of the same, taken through the line $x\ x$, fig. 1.

Similar letters of reference indicate corresponding parts.

My invention has for its object to improve the construction of the action-mechanism of organs, so that the pallet may be operated, to make the pipes speak, by the pressure of the wind in the wind-chest, thus greatly lessening the labor of playing the organ; and It consists in placing the pneumatic pallet in the wind-chest of the sounding-board.

A represents one of the keys, which is constructed and pivoted in the ordinary manner.

B is the sticker, the lower end of which rests in a socket in the key A, and the upper end of which passes up through the bottom of the wind-chest C, and is loaded or weighted sufficiently to bring it down when the pressure of the key is removed.

D is a valve, formed upon the sticker B, placed in a recess in the bottom of the wind-chest C, and provided with an upper and lower valve-seat, as shown in figs. 1 and 2.

E is a small pneumatic pallet or bellows, the interior of which is connected with the valve-chamber of the valve D by a groove, F, as shown in fig. 1, so that when the said valve D is raised, there may be an open connection between the interior of the pneumatic pallet E and the open air, and when the valve D is lowered, there may be a free connection between the interior of the pneumatic pallet E and the interior of the wind-chest C.

The upper or movable part of the pneumatic pallet is connected with the pallet G, by a connecting-rod, H, so that the pallet G may be opened, to cause the pipe I to speak, by lowering the upper or movable part of the pneumatic pallet E.

When the movable part of the pneumatic pallet E rises, the pallet G is raised by the spring J.

The pipes I should be connected with the wind-chest C by a sounding-board, in the ordinary manner, which sounding-board is not shown in the drawing, as there is nothing new in its construction.

K is the wind-trunk, through which the wind is introduced into the wind-chest C.

By this construction, when the sticker or poppet B is raised, the pressure of the wind, in the wind-chest C, opens the pallet G, and allows the pipe to speak, so that all the power necessary to be applied to the keys A, is simply enough to raise the pneumatic valve D, the rest of the action being carried on by the pressure of the wind.

This construction also enables the poppet-valves to be placed directly above the keys, wherever the pneumatic pallets may be placed, the grooves or air-passages F, by which the valves D are connected with said pneumatic pallets, running radially, or in inclined directions, from said sticker-valves to said pneumatic pallets, however great the distance may be.

When this improvement is attached to organs already built, the wind-chests, in which the pneumatic pallets E are placed, are arranged beneath the ordinary wind-chest, and are connected with it by pipes, so that the pressure of the wind may be uniform in both, or, rather, so that they both may form one wind-chest.

I claim as new, and desire to secure by Letters Patent—

1. Placing the pneumatic pallet E in the wind-chest C of the sounding-board, substantially as herein shown and described, and for the purpose set forth.

2. In combination with the pallet placed in the wind-chest, the radiating grooves or separate air-passages F, as herein described, for the purpose specified.

The above specification of my invention signed by me, this 8th day of March, 1869.

JOHN R. MORTIMORE.

Witnesses:
FRANK BLOCKLEY,
JAMES T. GRAHAM.